US00RE37915E

(19) United States
(12) Reissued Patent
Lapoint, III

(10) Patent Number: US RE37,915 E
(45) Date of Reissued Patent: Dec. 3, 2002

(54) COLLAPSIBLE, LIGHTWEIGHT BULK SHIPPING CONTAINER

(75) Inventor: John H. Lapoint, III, Kennebunkport, ME (US)

(73) Assignee: Citizens Bank New Hampshire, Portland, ME (US)

(21) Appl. No.: 09/802,456

(22) Filed: Mar. 8, 2001

Related U.S. Patent Documents

Reissue of:
(64) Patent No.: 6,000,604
Issued: Dec. 14, 1999
Appl. No.: 09/036,882
Filed: Mar. 9, 1998

(51) Int. Cl.[7] ..... B65D 5/60; B65D 30/08
(52) U.S. Cl. ..... 229/117.35; 53/376.4; 383/24; 383/99; 383/109; 383/119; 229/125.38
(58) Field of Search ..... 229/117.35, 125.37, 229/125.38, 125.29, 125.41; 383/24, 99, 104, 109, 111, 119; 53/376.4

(56) References Cited

U.S. PATENT DOCUMENTS 1,768,989 A * 7/1930 Laacke ..... 383/99
4,207,937 A * 6/1980 Sandeman et al. ..... 383/24
4,534,489 A * 8/1985 Bartlett ..... 229/125.41
4,903,859 A * 2/1990 Derby et al. ..... 383/109
5,025,925 A * 6/1991 Wiklund ..... 383/119
5,158,369 A * 10/1992 Derby ..... 383/119
5,209,364 A * 5/1993 Lapoint, Jr. ..... 383/109
5,323,922 A * 6/1994 Lapoint, Jr. et al. ..... 383/119
5,423,611 A * 6/1995 Sherrard ..... 383/119
5,454,471 A * 10/1995 Norvell ..... 229/125.37
5,800,061 A * 9/1998 Volles ..... 383/99

FOREIGN PATENT DOCUMENTS

DE 2444303 A1 * 4/1975

* cited by examiner

*Primary Examiner*—Gary E. Elkins
(74) *Attorney, Agent, or Firm*—Pierce Atwood

(57) ABSTRACT

A container is assembled from several panels generally comprised of one or more layers of relatively rigid stiffening material (such as corrugated cardboard) sandwiched between two layers of a strong, flexible material, such as woven polypropylene. These panels form four side wall assemblies and, in combination with a flexible bottom panel, form a self-supporting, generally cubic material receiving box. An integral closure assembly, including cover flap, front flap and side flaps, advantageously enable the container to conveniently and safely secure relatively large volumes of dense debris without spillage even when the fully laden container is dropped during handling. The container, when empty, may be collapsed for convenient storage.

15 Claims, 7 Drawing Sheets

COLLAPSIBLE, LIGHTWEIGHT BULK SHIPPING CONTAINER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to industrial containers, and more particularly to collapsible, lightweight, free-standing containers designed for transporting bulk material, such as hazardous solid waste, in the form of an aggregate or a slurry.

2. Background Information

Conventional bulk shipping containers generally use either a bag concept or a rigid box concept. The bag type container tends to be lightweight and easily collapsed when empty into a small volume for easy storage and shipping. It is, however, difficult to load and unload because it lacks rigidity and thus will not support itself in an open orientation to facilitate loading. Also it is difficult to handle mechanically, such as with a fork lift, without puncturing the bag. The rigid box design, on the other hand, has the rigidity necessary to facilitate loading, to permit stacking of loaded containers, and to allow easy handling with fork lifts and other mechanical devices. However, by their very nature, such containers are not collapsible and thus require large volume for storing and shipping even when empty.

Recent attempts to overcome these difficulties are described in U.S. Pat. No. 5,323,922 (the '922 patent) issued to J. H. Lapoint, Jr., et al. which is hereby fully incorporated by reference herein. The '922 patent discloses a collapsible shipping container constructed using side wall assemblies made from a double layer of flexible material formed into pockets into which stiffeners are inserted. These containers can be collapsed into a small volume for storage or shipping while empty. They are lightweight and rigid enough that they can be filled and discharged easily, can be stacked during shipment even when loaded, and generally will not slump, tilt, or topple over during shipment. They also have loop type handles so that they can be easily handled by mechanical equipment like fork lifts without danger of breaching the containment integrity of the container.

A drawback of this approach, however, is that it utilizes a relatively complex closure assembly in order to provide the requisite structural integrity to resist spillage of the contents during handling. This closure assembly includes a discrete cover piece, several overlapping layers of flaps on the top of the container, and a relatively large number of flexible ties at spaced locations about the entire periphery of the cover piece. The discrete or non-integral cover piece may become separated from the rest of the container assembly and be lost. Multiple layers of materials tend to increase the cost of manufacturing the container. Moreover, the relatively large number of flexible ties in a complex closure arrangement increases the time and labor costs of using the container in its eventual application. Moreover, the use of ties about the entire periphery of the cover generally requires access to all sides of the container to secure it. This lends to disadvantageously prevent one from placing several empty containers side by side for simultaneous filling, or from otherwise placing a container in confined locations, i.e. against a wall, for filling.

Thus, a need exists for a bulk material container that has a simplified closure assembly, substantially without any discrete or unattached components, and that may be sealed shut from one side thereof to simplify its manufacture and use.

SUMMARY OF THE INVENTION

According to an embodiment of this invention, a collapsible container adapted to receive bulk material therein, includes:

- a plurality of wall portions, each of the plurality of wall portions including a plurality of layers of flexible sheet material and a semi-rigid stiffener superposed therebetween;
- a bottom portion including at least one layer of flexible sheet material disposed integrally with the plurality of wall portions, wherein the bottom portion and the plurality of wall portions define a material receiving cavity;
- a flexible closure assembly disposed integrally with at least one of the plurality of wall portions, the flexible closure assembly adapted to selectively open and close the material receiving cavity;
- wherein the collapsible container is a unitary device adapted for being alternately collapsed for storage and erected to a self-supporting configuration for receipt and containment of the bulk material.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Figure 1:
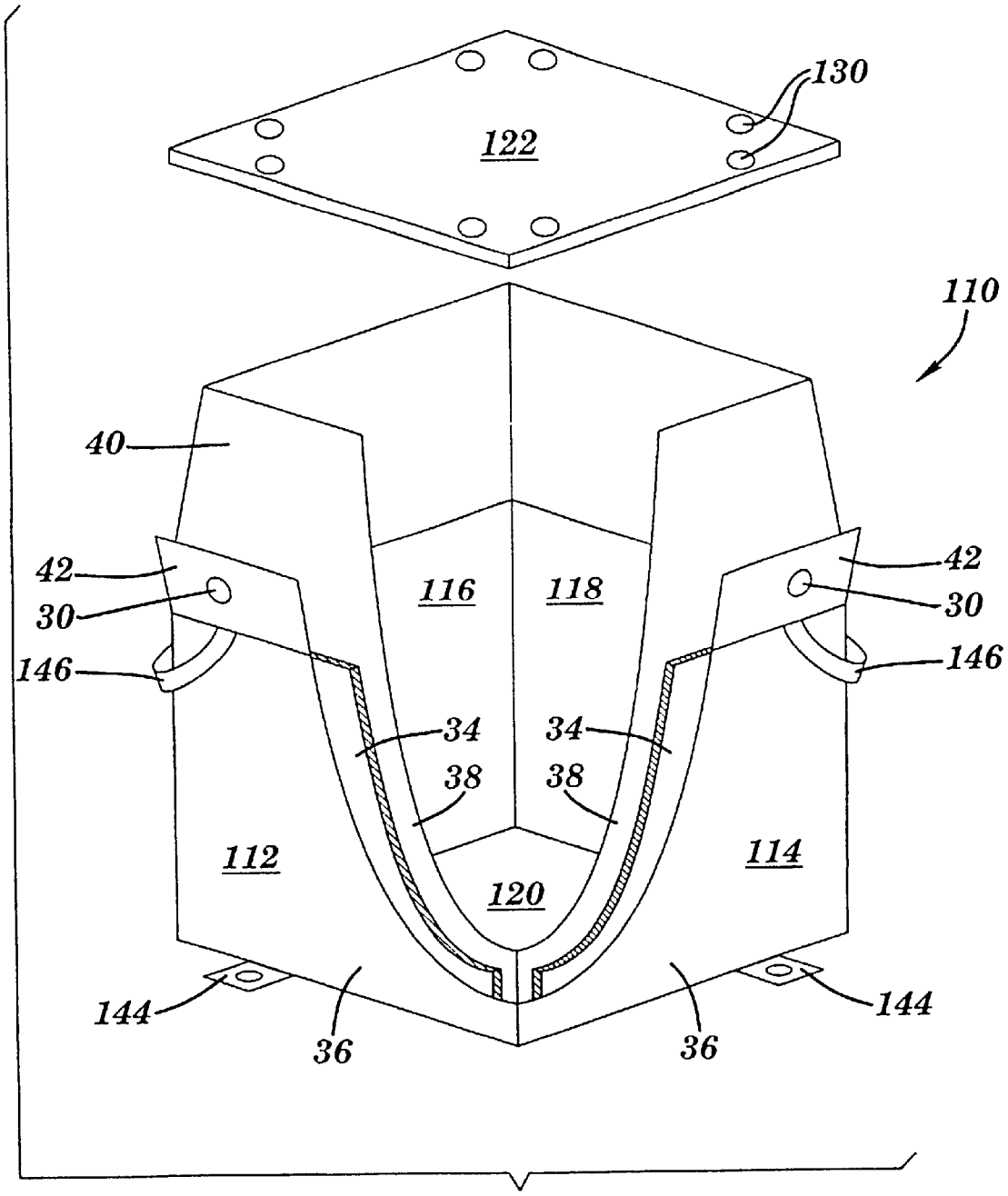
FIG. 1 PRIOR ART
FIG. 1 is a partially exploded diagrammatic perspective view, partially broken away, and in section, of a container of the prior art, in an opened condition, ready for loading.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Briefly described, the subject invention comprises a container 10 (FIG. 2) assembled from several panels generally comprised of one or more layers of relatively rigid or semi-rigid stiffening material (such as corrugated cardboard) sandwiched between two layers of a strong, flexible material, such as polypropylene. These panels form side wall assemblies 12, 14, 16, and 18, which, in combination with a flexible bottom panel 20, form a self-supporting, generally cubic material receiving box. An integral closure assembly 21, including cover assembly or cover flap 22, [front flap 24] and side flaps 26, advantageously enables container 10 to conveniently and safely secure relatively large volumes of dense debris without spillage even when the fully laden container is dropped during handling. The container, when empty, may be collapsed for convenient storage.

As used herein, the term "bulk material" shall be defined as a quantity of either hazardous or non-hazardous material which tends to be dimensionally unstable, i.e. liquid material or a flowable solid such as, for example, sand, soil, debris, plastic or polymeric granules, beads, pills, etc. One skilled in the art will recognize that polymeric sheet materials of the type utilized in construction of the present invention tend to melt and harden about the periphery of a burn hole to form a hard annulus similar to a grommet. Thus, as used herein, the term "grommet" shall be defined to include both conventional grommets and burn holes.

Referring now to the drawings in detail, as shown in FIG. 1, a prior art container 110 includes side wall assemblies 112, 114, 116, 118, a bottom wall 120, and a cover member 122. The wall assemblies are each comprised of one or more layers of a relatively rigid stiffening panel 34 sandwiched between two layers 36 and 38 of strong, flexible, material, such as woven polypropylene. The inner layer 38 of the side wall assemblies extends above the stiffening panels to form a component part of the closure, or inner cover flap 40. The outer layer 36 extends above the stiffening panels to form an outer closure flap 42 which is provided with a spaced array of grommets or burn holes 30. The bottom wall 120 is preferably formed of a double layer 36 and 38 of the same flexible material of the side wall assemblies. Cover member 122 is substantially the same size as the bottom wall 120, and is provided with a spaced array of grommets 130, each aligned with a respective grommet 30 of the side wall flaps.

The subject container is provided with tie down means 144 to be used to secure the container to a pallet(not shown) during shipment, and with lifting loops 146 which allow the container to be gripped and lifted by mechanical means.

Figure 2:
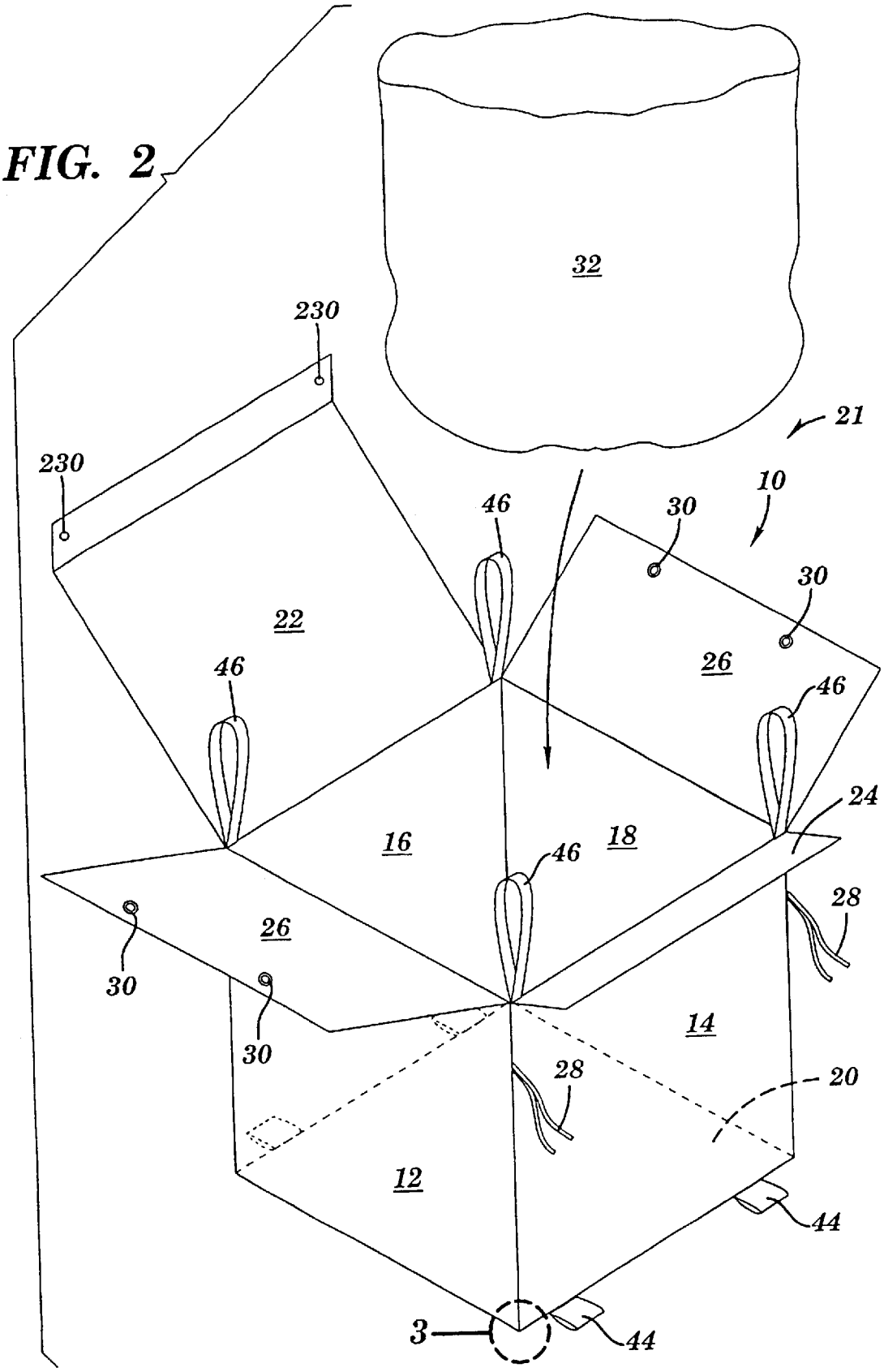
FIG. 2 is a partially exploded, diagrammatic perspective view of an embodiment of the present invention in an opened or erected condition, ready for loading.

Referring now to FIG. 2, container 10 of the present invention has a substantially cubic shape, having side wall assemblies 12, 14, 16, 18, and a bottom wall 20 fabricated substantially as set forth in the aforementioned '922 patent. Bottom wall 20 is formed by two or more layers of preferably the same strong, flexible, preferably liquid-proof material as the side assemblies but without a stiffening member. The container also includes tie down means 44 and lifting loops 46 which are similar in construction and use to those shown in FIG. 1. An integral bottom 20 is preferably fabricated from the same material as the side walls, without stiffening panel 34. Grommets 30 are disposed at predetermined locations in side flaps 12 and 18 and in cover flap 22 to provide a simple means of closure for the box, which will be discussed in greater detail hereinafter.

Integral closure assembly 21 includes cover assembly 22, [front flap 24] and side flaps 26. As shown, side wall assemblies 12 and 18 have flaps 26 of equal size formed by extending the inner and outer layers of flexible material from the opening or mouth of the container to a terminal edge. Flaps 26 are preferably fabricated without a stiffening member disposed between the fabric layers. The two layers of flexible material are, in a preferred embodiment, stitched together to form each flap 26. Each flap 26 is sized so that it extends approximately half way across the top of the container 10 when folded inwardly to its closed position, as will be discussed hereinafter with respect to FIG. 4. Each flap 26 is further provided with two grommets 30 spaced apart generally along the terminal edge thereof so that when the flaps 26 are closed over the top of the container, they can each be fastened to a corresponding grommet in the opposite flap as will be described in detail hereinbelow. Flap 24 extends from front wall assembly 14 in a similar manner as the side wall flaps 26. Flap 24, in a preferred embodiment, includes neither a stiffening member nor grommets. Cover assembly 22 extends from sidewall assembly 16 in substantially the same manner in which side wall flaps 26 extend from side walls 12 and 18, preferably without a stiffening member. Cover assembly 22 is sized and shaped to extend across and substantially close the top of the container and extend partially down the front wall as will be discussed hereinafter with respect to FIG. 6. Cover assembly 22 has a grommet 30 disposed proximate each corner of the flap along the terminal edge thereof. Cover assembly 22 is sized so that, when folded over the top of the container 10, the two grommets 30 are disposed in engageable proximity to integral ties 28 for securing the top in place and preferably in tension, as will be discussed in detail hereafter.

Any number of materials may be utilized for construction of flexible layers 36 and 38 of the present invention. The chosen material is preferably UV and water resistant, to help ensure integrity of the container when exposed to the environment and adverse weather conditions. A preferred material, as discussed in the above-referenced '922 patent, is woven polypropylene chemically treated in a known manner for UV resistance and which also may be treated in a conventional manner for improved water resistance. The construction of the present invention, including the fabric panels and stiffening panels 34 sandwiched therebetween, provides a lightweight and inexpensive container that is alternately movable between collapsed storage and erected, self-supporting orientations. This construction, moreover, provides the present invention with requisite structural integrity for containing relatively large volumes of dense material, such as, for example, earth or construction debris, etc.

Moreover, as shown in FIG. 2 a liner or bag 32 may be used in one embodiment either to maintain the cleanliness of the container for reuse or to provide liquid-tight containment during shipment of a wet material or slurry. Bag 32 may be fabricated from woven polypropylene, waterproofed woven polypropylene, polyethylene, high density polyethylene, NYLON® or combinations thereof. In a preferred embodiment, bag 32 may be fabricated from a flexible resilient material, such as woven polypropylene to increase the structural rigidity of the collapsible container.

Figure 3:
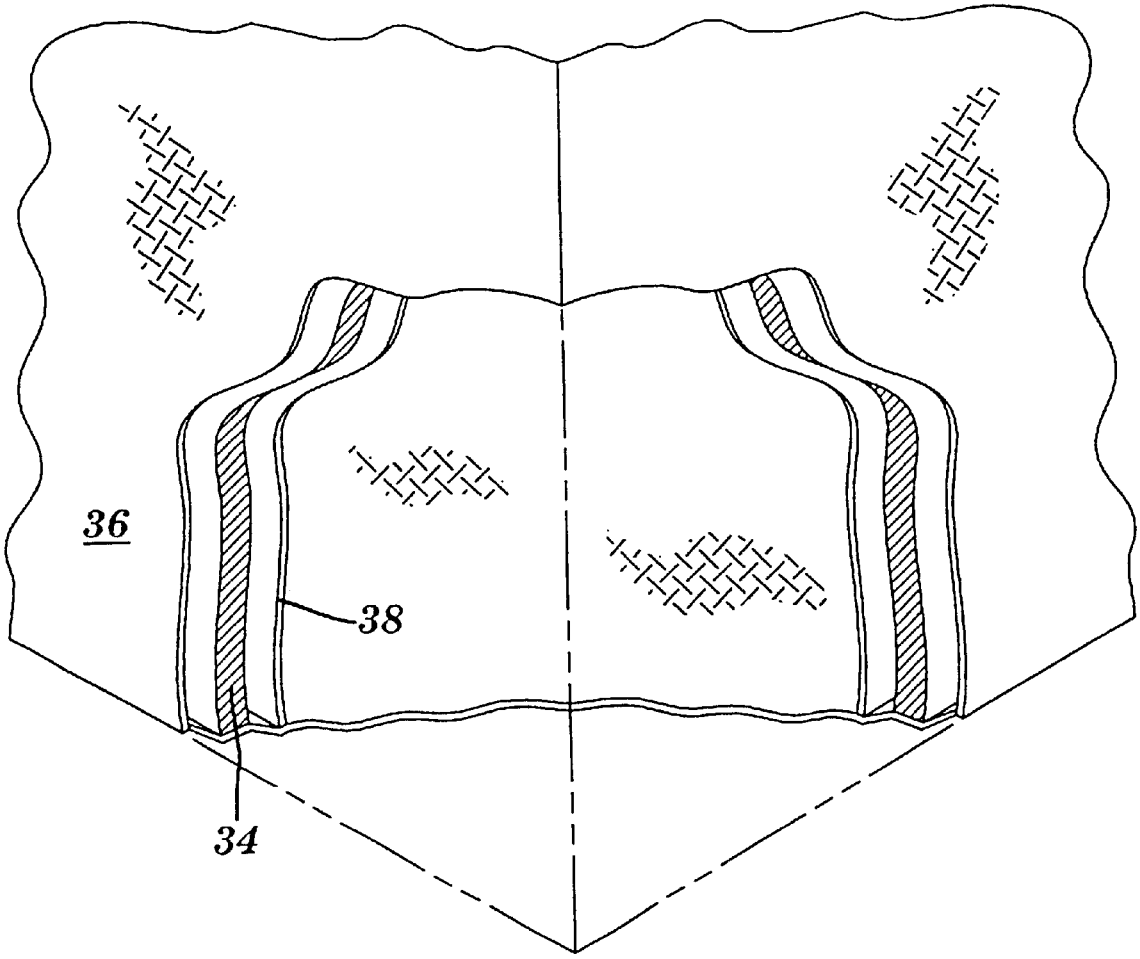
FIG. 3 is an enlarged, perspective, fragmentary, cutaway view at the location designated by 3 in FIG. 2.

Turning to FIG. 3, the construction of the wall assemblies is substantially identical in that disclosed in the above-referenced '922 patent, including stiffening member 34. Member 34 preferably includes rigid plastic, corrugated fiber board, or similar material, disposed in pockets formed by inner and outer layers 36 and 38. The pockets formed by the inner 38 and outer 36 layers of the flexible material are sewn or similarly sealed shut (not shown) during manufacture of the container to secure the stiffeners within their respective wall portions.

Figure 4:
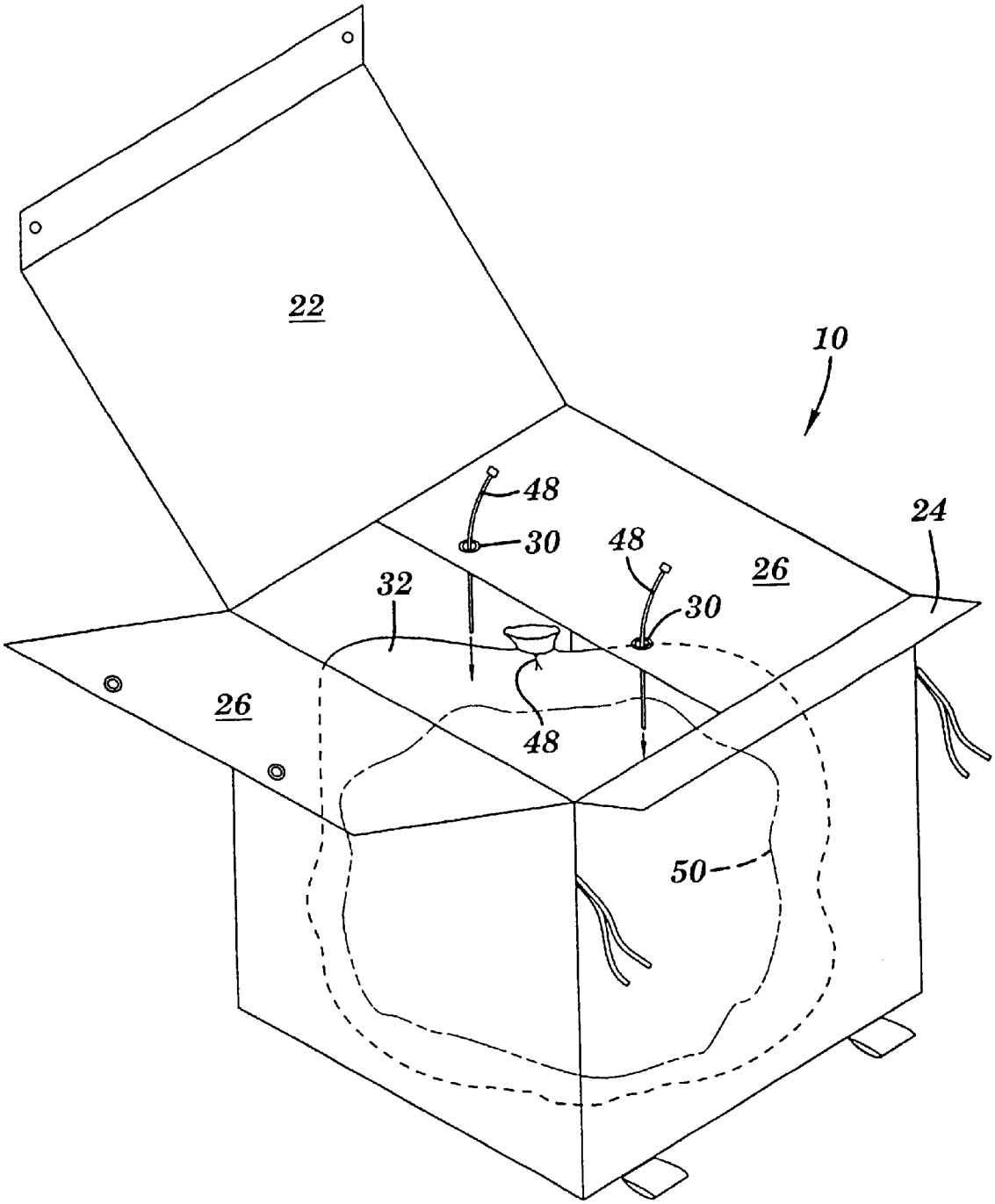
FIG. 4 is a perspective, diagrammatic view of the container of FIG. 2, during a step in the process of closing the container, in which a first side flap is folded over the container.
Figure 5:
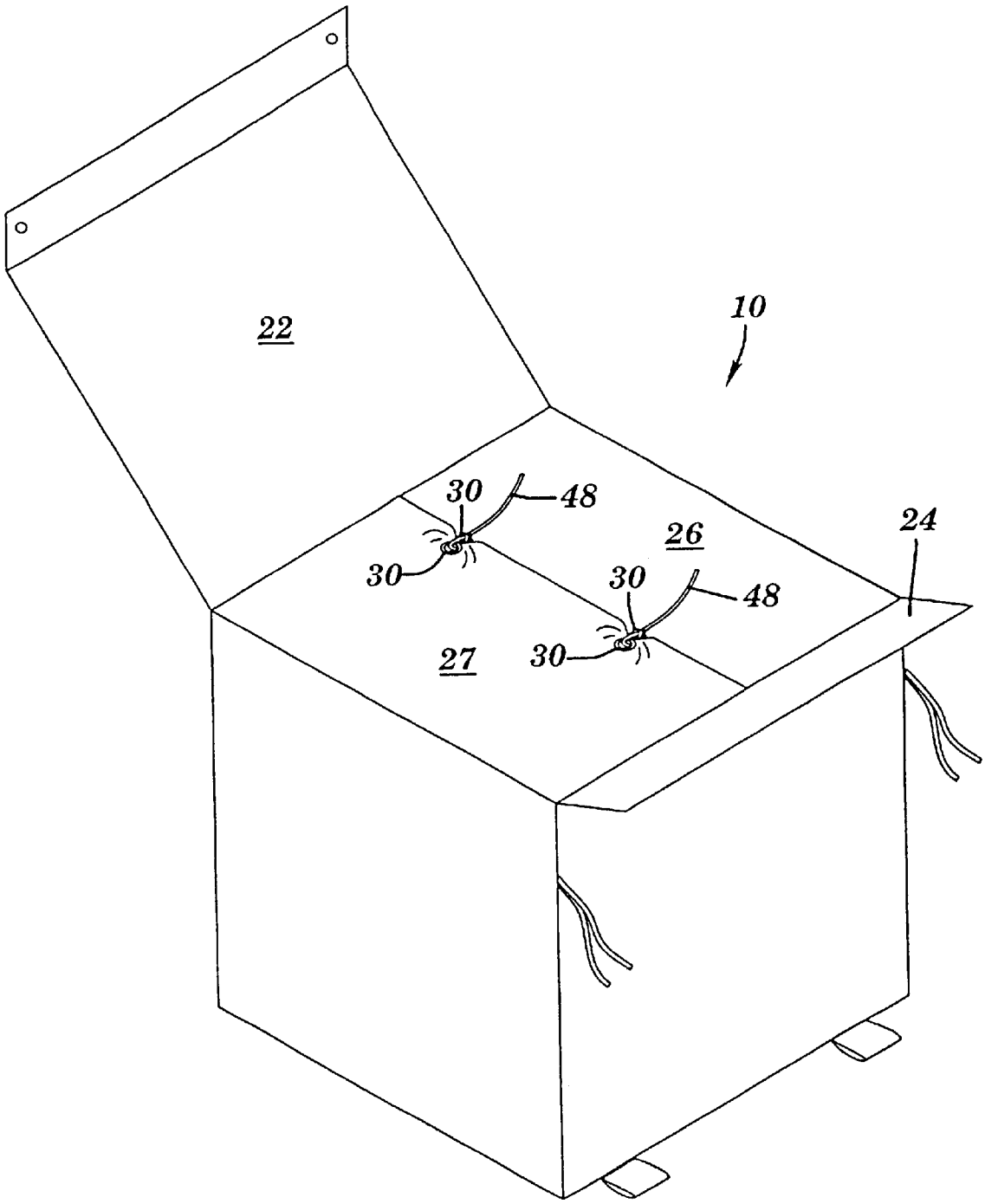
FIG. 5 is a view similar to that of FIG. 4, of another step in the closure process of the present invention, in which a second side flap is folded over the top and tied to the first side flap.
Figure 6:
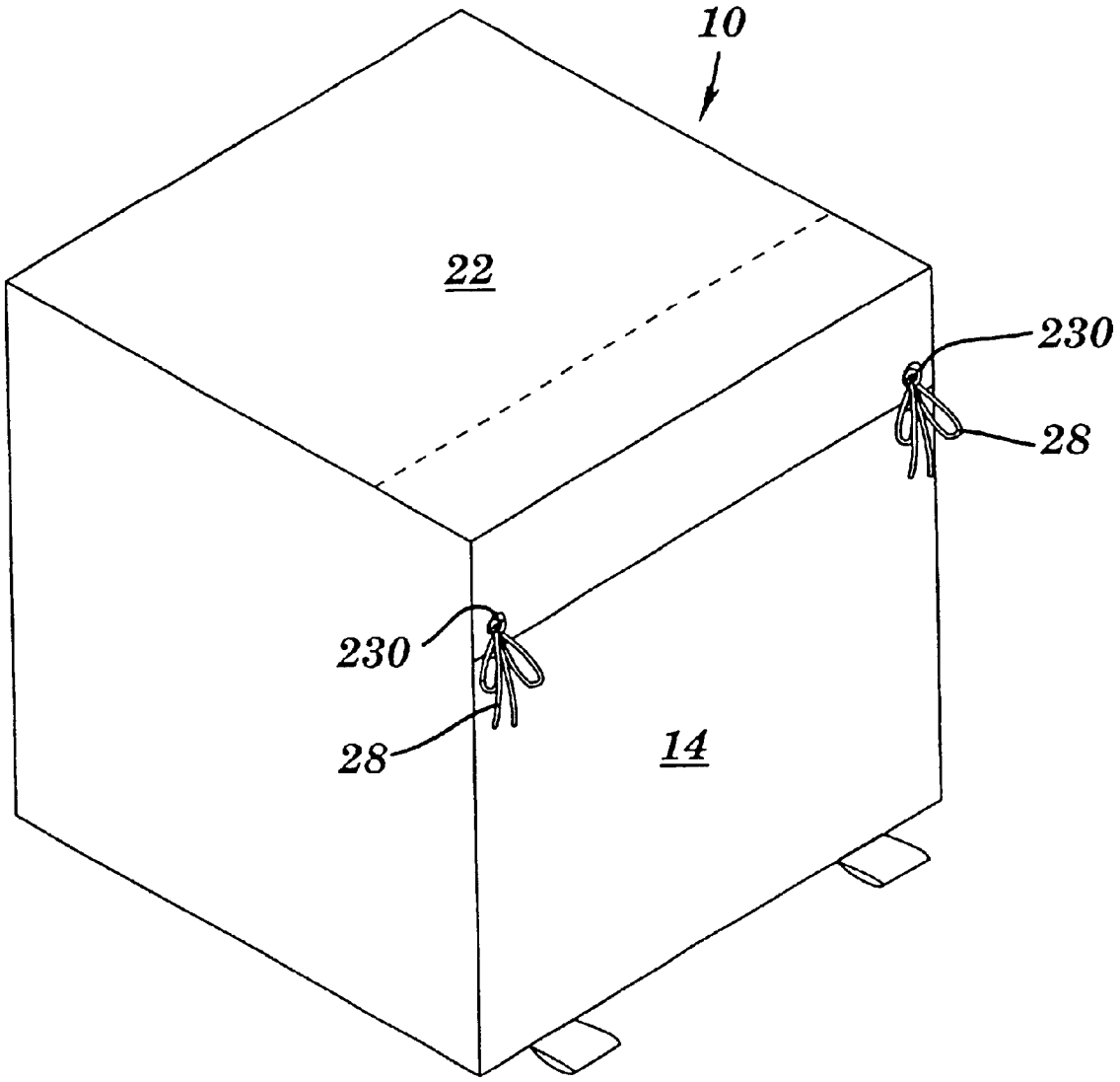
FIG. 6 is a perspective, diagrammatic view of the container of FIGS. 2–5 in its closed position ready for shipment.

FIGS. 4–6 disclose successive steps in the process of utilizing closure assembly 21 of the present invention.

Referring now to FIG. 4, in a preferred embodiment, bag 32 is disposed within container 10 and then filled with material 50. The bag is cinched shut in a conventional manner as shown, using a flexible tie element 48. One side flap 26 is then folded over the top or mouth of the container. A flexible tie element 48 is then inserted through the grommets 30 thereof as shown. The flexible tie elements, as disclosed in the aforementioned '922 patent, may be any one of many conventional one-way flexible ties readily available from several sources.

Referring to FIG. 5, a second side flap 27 is folded over the top of the container 10. It is provided with a size predetermined so that its terminal edge substantially meets the terminal edge of side flap 26. Each flexible tie element 48 may then pass through a respective grommet 30 in side flap 27 and lightened to secure the side flaps under in place and under tension as shown, when container 10 is filled with bulk material.

FIG. 6 shows the container 10 in its fully closed arrangement. Front flap 24 has been folded over the top of the container before moving the cover flap 22 into its closed position as shown. In this regard, cover flap 22 is folded over the top of container 10 and partially down the front sidewall assembly 14 where grommets 30 disposed on opposite corners of the terminal edge of the flap are adapted for engagement with ties 28 disposed integrally on the container. As shown, integral ties 28 are tied through the respective grommets 30 to maintain the cover flap in tension (when the container is substantially filled) as the final closure step. As mentioned hereinabove, only one edge of cover flap 22 is provided with grommets 30 and integral ties 28 are disposed only on a single wall 14. Advantageously, this simplifies fastening of cover flap 22 and enables such fastening to be accomplished by a user having access to only one side of the fully laden container 10. This aspect tends to facilitate close packing of multiple containers for simultaneous or sequential filling, or use of container 10 in otherwise close quarters.

Figure 8:
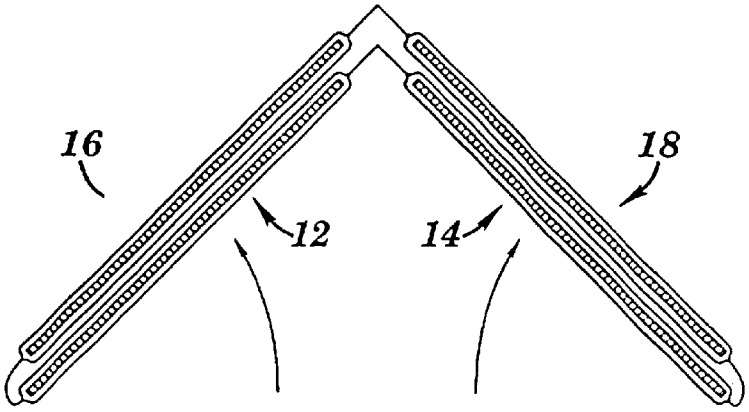
FIGS. 7, 8, and 9 are diagrammatic, cross-sectional plan views of the container of FIG. 2, during steps in the process of folding it into its collapsed storage position.
Figure 9:
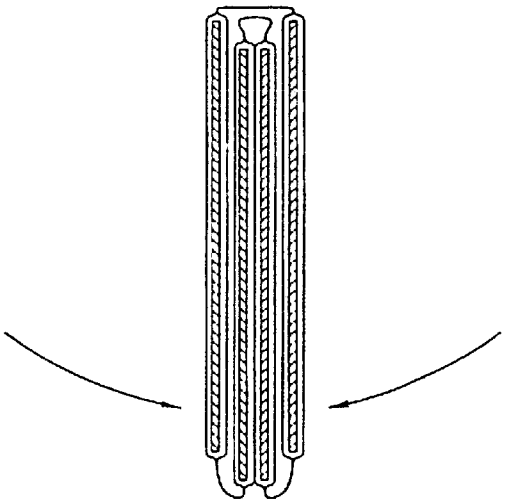
Figure 7:
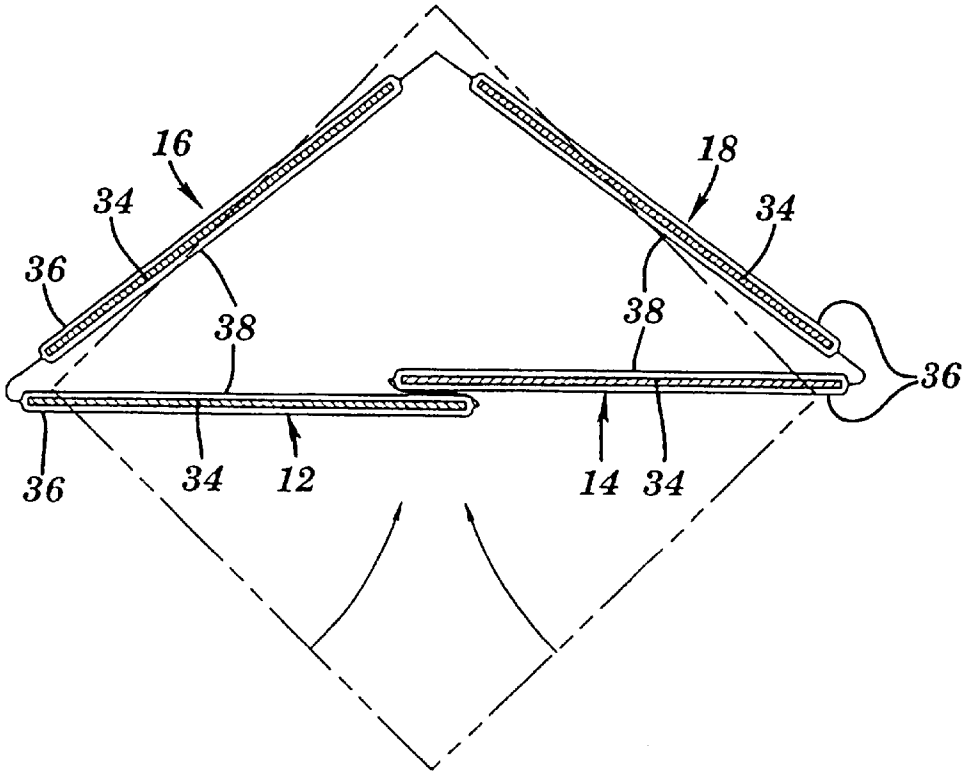

As shown in FIGS. 7–9, container 10, when empty, may be collapsed into a relatively small volume for storage or shipping. Referring now to FIG. 7, in the first step of the process one corner, in this example the corner between side walls 12 and 14, is moved toward the diagonally opposite corner. The tolerances between the stiffeners 34 and the pocket formed by the inner 38 and outer 36 layers of flexible material permit container 10 to be temporarily distorted into the configuration shown. FIG. 8 shows a subsequent step of the process wherein the container cross-section has reached an "L" shaped or nested configuration. In this orientation, the two diagonally opposite corners fully brought together so that the walls 12 and 14 are disposed in parallel relation with walls 16 and 18, respectively. FIG. 9 shows the completed configuration in which the container is collapsed upon itself wherein walls 12, 14, 16 and 18 are all superposed in parallel orientation relative to one another to minimize its volume for shipping or storage.

Closure assembly 21 of container 10 as embodied in the present invention is advantageously simpler, easier, and faster to use than prior art containers that utilize a discrete, rigid cover portion. Such simplicity tends to facilitate greater productivity for the user, for reduced costs.

Another advantage of the present invention is that the container 10 comprises a single integral assembly with no separate parts to become lost or separated during shipping or storage of the empty containers. In this regard, container 10 may be collapsed without removing any of the stiffeners as illustrated in FIGS. 7–9.

A further advantage of the present invention is that the manufacturing cost of the container is reduced by twenty-five to thirty-five percent over prior art containers due to use of fewer parts, and less material.

Moreover, while the present invention offers the above-referenced advantages, tests of embodiments of the invention fabricated from 6.5 ounce woven polypropylene ranging in capacity from 0.9 to 1.4 cubic meters, and including bag 32, have been shown to be capable of holding up to 1350 kg of bulk material, while satisfying all test standards needed to obtain UN (United Nations) approval. These test standards include drop, topple, stacking, top lift and tear tests. Embodiments of the present invention fabricated using 8 ounce woven polypropylene have been similarly tested and found to be capable of holding up to 3200 Kg of bulk material. [The containers of the present invention have also been found to pass the following DOT (US Department of Transportation) 7A TYPE A tests: Free Drop, Water Spray, Compression, and Penetration; and the following 49 CFR PART 178 tests: Drop Test, Topple Test, Stacking Test, and Tear Test.] The loaded containers may be stacked up to three deep with no deterioration of the bottom container in the stack. The loaded containers also may be dropped or toppled with substantially no deformation of the container and no loss of contents. These results were surprising in light of the relative simplicity of the closure assembly, including use of a flexible, rather than rigid cover, and securing the cover along only one edge thereof.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A collapsible container adapted to receive bulk material therein, the collapsible container comprising:

a plurality of wall portions, each of said plurality of wall portions including a plurality of layers of flexible sheet material and a semi-rigid stiffener superposed therebetween;

a bottom portion including at least one layer of flexible sheet material disposed integrally with said plurality of wall portions, wherein said bottom portion and said plurality of wall portions define a material receiving cavity;

a flexible closure assembly disposed integrally with said plurality of wall portions, said flexible closure assembly adapted to selectively open and close the material receiving cavity, the flexible closure assembly comprising:

a flexible cover extending integrally from one of said wall portions;

a pair of side flaps extending from opposite wall portions, said pair of flaps being sized and shaped to extend towards one another for tensioned mutual engagement to substantially close the material receiving cavity;

[a front flap extending from a wall portion disposed opposite said flexible cover and adapted for superimposed engagement with said pair of side flaps;]

cover securing means disposed integrally on *one or more of* said plurality of wall portions;

said flexible cover being sized and shaped for being secured in tension by said cover securing means in superposed orientation with said mutually engaged pair of side flaps [and said front flap] to secure the bulk material within said collapsible container wherein said collapsible container is a unitary device adapted for being alternately collapsed for storage and erected to a self-supporting configuration for receipt and containment of the bulk material.

2. The collapsible container as set forth in claim 1, wherein said pair of side flaps extend from opposite wall portions, terminating at terminal edges having an array of grommets disposed thereon, wherein corresponding grommets of each said array of grommets are adapted for being fastened to one another for said tensioned mutual engagement.

3. The collapsible container as set forth in claim 1, wherein said flexible cover is adapted for being engaged by said cover securing means along a single edge thereof to enable a user to alternately engage and release said flexible cover while having access to only one side of said collapsible container.

4. The collapsible container as set forth in claim 3, further comprising an array of grommets disposed in spaced relation on a terminal edge of said flexible cover, said flexible cover securing means including an array of flexible ties disposed in spaced relation on said plurality of wall portions, wherein each of said array of flexible ties is adapted for tensioned engagement with at least one grommet of said array of grommets to secure said flexible cover in said superposed orientation.

5. The collapsible container as set forth in claim 4, wherein said flexible ties are only disposed on one of said plurality of wall portions.

6. The collapsible container as set forth in claim 1, wherein said layers of flexible sheet material comprise woven polyethylene.

7. The collapsible container as set forth in claim 6, wherein said semi-rigid stiffener comprises corrugated cardboard.

8. The collapsible container as set forth in claim 1, being adapted to contain up to approximately 0.9 to 1.4 cubic meters of bulk material.

9. The collapsible container as set forth in claim 8, being adapted to contain up to approximately 3200 Kg of bulk material.

10. The collapsible container as set forth in claim 1, further comprising a flexible liner adapted for disposition within said collapsible container.

11. The collapsible container as set forth in claim 10, wherein said flexible liner is fabricated from one of the materials selected from the group consisting of woven polypropylene, waterproofed woven polypropylene, polyethylene, high density polyethylene, NYLON® and combinations thereof.

12. The collapsible container as set forth in claim 10, wherein said flexible liner further comprises a substantially waterproof bag adapted to facilitate containment of wet bulk material.

13. The collapsible container as set forth in claim 12, wherein said waterproof bag is sealable.

14. A method of securing bulk material for storage or transport, the method comprising the steps of:

(a) providing a collapsible container having:

i) a plurality of wall portions, each of said plurality of wall portions including a plurality of layers of flexible sheet material and a semi-rigid stiffener superposed there between;

ii) a bottom portion including at least one layer of flexible sheet material disposed integrally with said plurality of wall portions, wherein the bottom portion and the plurality of wall portions define a material receiving cavity;

iii) a flexible closure assembly disposed integrally with at least one of said plurality of wall portions, said flexible closure assembly adapted to selectively open and close the material receiving cavity, wherein the collapsible container is a unitary device adapted for being alternately collapsed for storage and erected to a self-supporting configuration for receipt and containment of the bulk material;

(b) opening the flexible closure assembly;

(c) depositing the bulk material in the material receiving cavity;

(d) extending a pair of flaps towards one another and mutually engaging the pair of flaps to substantially close the material receiving cavity;

(e) [extending a front flap in superimposed relation with the pair of flaps;]

[(f)] extending a cover in superposed relation with the pair of flaps [and the front flap];

[(g)] (*f*) securing the cover in said superposed relation.

15. A collapsible container adapted to receive bulk material therein, the collapsible container comprising:

(a) a plurality of wall portions, each of said plurality of wall portions including a plurality of layers of flexible sheet material and a semi-rigid stiffener superposed therebetween;

(b) a bottom portion including at least one layer of flexible sheet material disposed integrally with said plurality of wall portions, wherein said bottom portion and said plurality of wall portions define a material receiving cavity;

(c) a flexible closure assembly disposed integrally with at least one of said plurality of wall portions, said flexible closure assembly adapted to selectively open and close the material receiving cavity, said flexible closure assembly including:

(i) a flexible cover extending integrally from one of said wall portions;

(ii) a pair of side flaps extending from opposite wall portions and sized and shaped to extend towards one another for tensioned mutual engagement to substantially close the material receiving cavity when bulk material is disposed therein;

(iii) [a front flap extending from a wall portion disposed opposite said flexible cover and adapted for superimposed engagement with said pair of side flaps;]

[(iv)] cover securing means disposed integrally on *one or more of* said plurality of wall portions, said flexible cover sized and shaped for being secured in tension by said cover securing means in superposed orientation with said mutually engaged pair of side flaps [and said front flap] to secure the bulk material within said collapsible container;

wherein said collapsible container is a unitary device adapted for being alternately collapsed for storage and erected to a self-supporting configuration for receipt and containment of the bulk material.

* * * * *